United States Patent [19]

McGreehan et al.

[11] Patent Number: 4,715,213
[45] Date of Patent: Dec. 29, 1987

[54] FLOW MEASUREMENT SYSTEM

[75] Inventors: William F. McGreehan, Fairfield; Laurence T. Sherwood, Cincinnati, both of Ohio

[73] Assignee: General Electric Company, Cincinnati, Ohio

[21] Appl. No.: 839,840

[22] Filed: Mar. 13, 1986

[51] Int. Cl.[4] .............................................. G01M 3/20
[52] U.S. Cl. ........................................ 73/40.7; 277/2
[58] Field of Search ................... 73/40.7, 49.8, 861.07; 277/2, 57, 53

[56] References Cited

U.S. PATENT DOCUMENTS

| | | | |
|---|---|---|---|
| 3,041,834 | 7/1962 | Davies et al. | 60/39.09 |
| 3,347,604 | 10/1967 | Lavelle et al. | 277/57 X |
| 4,028,928 | 6/1977 | van Delan et al. | 73/40.7 |
| 4,121,455 | 10/1978 | Haslett et al. | 73/861.07 X |
| 4,159,636 | 7/1979 | Jicha et al. | 73/37.6 |
| 4,232,546 | 11/1980 | Dumont | 73/40.7 |
| 4,574,619 | 3/1986 | Castellant et al. | 73/40.7 |

FOREIGN PATENT DOCUMENTS

| | | |
|---|---|---|
| 0099129 | 1/1984 | European Pat. Off. . |
| 0150266 | 8/1985 | European Pat. Off. . |
| 876476 | 9/1961 | United Kingdom . |
| 1496441 | 12/1977 | United Kingdom . |
| 2090665 | 10/1984 | United Kingdom . |

OTHER PUBLICATIONS

General Electric Technical Memorandum-69-50, Title: Seal Leakage Measurement by Helium Sampling, Prepared by: P. A. Perkins-1/14/69.
Secondary Systems Design Presentation, Prepared by: F. G. Haaser-Feb. 20, 1985.

Primary Examiner—Stewart J. Levy
Assistant Examiner—Joseph W. Roskos
Attorney, Agent, or Firm—Douglas S. Foote; Derek P. Lawrence

[57] ABSTRACT

A method and apparatus for measuring the leakage flow rate through a labyrinth seal is disclosed. This is achieved by first injecting a tracer gas through a spray tube at an upstream region of the seal. The tracer gas mixes with the gas stream to form a mixed flow stream. The concentration of the tracer gas in the mixed flow stream is then measured, allowing the leakage flow rate to be calculated.

17 Claims, 1 Drawing Figure

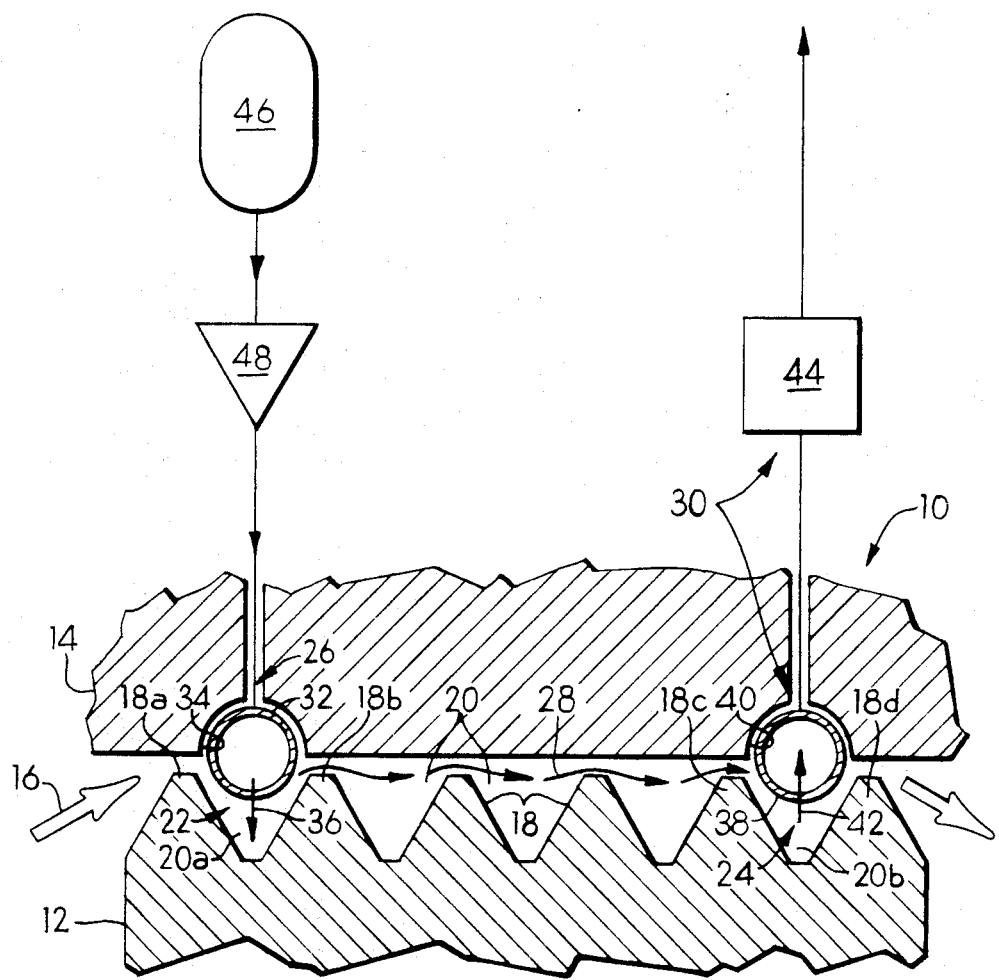

FLOW MEASUREMENT SYSTEM

The Government has rights in this invention pursuant to Contract No. F33657-83-C-0100 awarded by the Department of the Air Force.

This invention relates generally to rotary seals and, more particularly, to an apparatus and method for measuring the leakage flow rate through labyrinth seals.

BACKGROUND OF THE INVENTION

Rotary seals generally comprise two relatively rotatable members. In a labyrinth-type rotary seal, one such member typically includes one or more circumferential teeth which are coaxially positioned with respect to a circumferential sealing surface on the second member. Seals of this type are used to restrict the flow of a gas stream between cavities formed by the stationary and rotating members without impeding the rotational movement of the rotating member.

A disadvantage of seals of this type occurs when the thermal and mechanical forces acting on the seal change. Typically, one member responds quickly to the change in temperature resulting in thermally induced radial growth. At the same time, the other member may heat more slowly thereby thermally growing at a slower rate. Similarly, the rotating member will undergo mechanical growth when operating due to centrifugal forces acting thereon. Such transient conditions may affect the steady state running clearance.

At equilibrium operating temperature, the separation or gap between rotating and stationary members is designed to be fixed at a typically small value. In practice, large variations occur in the steady state running clearance due in part to transient conditions as well as the difficulty in calculating thermal/mechanical stresses at steady state. These large variations make accurate prediction of the leakage flow rate through the seal very difficult.

OBJECTS OF THE INVENTION

It is an object of the present invention to provide a new and improved method for determining the gap between rotating and stationary members of a labyrinth seal.

It is another object of the present invention to provide a method for measuring the flow rate of a gas stream through a labyrinth seal.

It is yet a further object of the present invention to provide a seal with new and improved means for measuring leakage flow rate therethrough.

SUMMARY OF THE INVENTION

One form of the present invention is a method for measuring the flow rate of a gas stream through a labyrinth seal. The method comprises the steps of injecting a tracer gas at an upstream region of the seal and detecting the concentration of the tracer gas at a downstream region of the seal; thereby determining the dilution of the tracer gas and thus the flow rate of the gas stream.

Another form of the present invention is a rotary seal with means for measuring the flow rate therethrough. The seal comprises a rotatable first member and a static second member which cooperates with the first member to restrict the flow of a gas stream passing therebetween from an upstream region to a downstream region. The seal also comprises injection means for injecting a tracer gas into the upstream region to mix with the gas stream thereby forming a mixed flow stream. The seal further includes detection means for measuring the concentration of the tracer gas in the downstream region thereby determining the flow rate of the gas stream.

BRIEF DESCRIPTION OF THE DRAWING

The FIGURE is a fragmentary view of a rotary seal according to one form of the present invention.

DETAILED DESCRIPTION OF THE INVENTION

A fragmentary view of a rotary seal 10 of the labyrinth type is shown in the figure. Such labyrinth seals have wide application and are particularly adaptable for use in gas turbine engines. Seal 10 includes a rotatable first member 12 and a static second member 14. Second member 14 cooperates with first member 12 to restrict the flow of a gas stream 16 passing therebetween.

First member 12 includes a plurality of seal teeth 18. Adjacent teeth 18 are separated by a gap 20. An upstream region 22 is defined in part by a first gap 20a between upstream teeth 18a and 18b. A downstream region 24 is defined in part by a second gap 20b between two downstream teeth 18c and 18d.

Rotary seal 10 also includes means for measuring the flow rate of gas stream 16. Such means includes injection means 26 for injecting a tracer gas into upstream region 22 to mix with gas stream 16 thereby forming a mixed flow stream 28. The means also includes detection means 30 for measuring the concentration of tracer gas in the downstream region 24.

In the embodiment shown, injection means 26 includes a spray tube 32 located within a first recess 34 of static member 14. Spray tube 32 is located radially outwardly from first gap 20A and injects a tracer gas into upstream region 22. According to a preferred embodiment, spray tube 32 has a plurality of first holes therein which are generally radially directed as shown by arrow 36.

Detection means 30 includes a perforated tube 38 located within a second recess 40 of static second member 14 for sampling the mixed flow stream 28. Perforated tube 38 has a plurality of second holes therein which in a preferred embodiment are generally radially directed as shown by arrow 42.

Detection means 30 further includes a tracer gas analyzer 44 such as a Model 50-450 Hi-Purity Analyzer, a thermoconductivity analyzer as may be purchased from GOWMAC Industries, Inc. According to another form of the present invention, a gas chromatograph or mass spectrometer may be utilized.

In operation, a tracer gas from a supply 46 will pass through a metering device 48 into a distribution manifold or injection means 26. Metering device 48 controls and measures the flow rate of the tracer gas. A suitable metering device 48 such as a variable area flow meter or turbine meter is available from Fisher and Porter, Warminster, Pennsylvania. Various gases may be usefully employed in this invention. According to a preferred embodiment, carbon dioxide or helium is used. The preferred embodiment uses a thermal conductivity analyzer as a tracer gas analyzer 44 and carbon dioxide and helium are particularly adaptable for such analysis.

After the tracer gas is injected, it mixes with gas stream 16 to form a mixed flow stream 28. A plurality of inwardly directed holes has been shown to be effective for promoting good mixing of the tracer gas with gas stream 16.

The mixed flow stream 28 is sampled in perforated tube 38 and passes into tracer gas analyzer 44 for detecting the concentration of tracer gas in the mixed flow stream. Given the flow rate of the tracer gas injected into the seal and the concentration of the tracer gas in the mixed flow stream, the seal leakage can be calculated as follows: if Y is the mass flow rate of gas stream 16 leaking through the seal, then $$Y = x(1-c)/R(c-j),$$

where x is the mass flow rate of the tracer gas as measured by metering device 48, c is the concentration by volume of the tracer gas in the mixed flow as measured by gas analyzer 44, R is the ratio of the density of the tracer gas to the density of air, and j is the concentration, if any, of the tracer gas in gas stream 16.

Another feature of the present invention is the relationship between the number of first holes in tube 32 and second holes in tube 38. Applicants have discovered that the orientation and number of first holes to second holes may be selected to reduce phasing effects. In other words, there may be only partial mixing of the tracer gas with gas stream 16 so that a non-uniform distribution of mixed flow 28 in the vicinity of the second region 24 occurs. In order to reduce such non-uniformity, the hole pattern in tubes 32 and 38 should be appropriately selected. For example, in one embodiment, 24 holes are used in tube 32 and 18 holes in tube 38.

It will be clear to those skilled in the art that the present invention is not limited to the specific embodiment disclosed and illustrated herein. Nor is the invention limited to rotary labyrinth seals in gas turbine engines. Rather, the invention may be applied equally to seals in any rotary machine. The invention is also not limited to the particular tracer gases or detecton means disclosed herein.

It will be understood that the dimensions and proportional and structural relationships shown in the drawing are illustrated by way of example only and these illustrations are not to be taken as the actual dimensions or proportional structural relationships used in the rotary seal of the present invention.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. A method for measuring the leakage flow rate of a gas stream through a seal, said seal being positioned between an upstream and downstream region of said gas stream to continuously block gas flow therebetween, said method comprising the steps of:
   injecting a tracer gas at said upstream region;
   mixing said tracer gas with said gas stream to form a mixed flow stream; and
   detecting the concentration of said tracer gas in said mixed flow stream at said downstream region to determine said leakage flow rate of said gas stream through said seal, said mixed flow stream at said upstream and downstream regions being substantially identical in its chemical composition.

2. A method, as recited in claim 1, wherein said tracer gas includes $CO_2$ or He.

3. A method, as recited in claim 1, wherein said leakage flow rate of said gas stream through said seal is determined by the equation:

$$Y = x(1-c)/R(c-j),$$

where
   Y = leakage flow rate of said gas stream,
   x = flow rate of said tracer gas,
   c = concentration by volume of said tracer gas in said mixed flow stream,
   R = ratio of the density of said tracer gas to the density of air, and
   j = concentration of said tracer gas in said gas stream.

4. A rotary seal comprising:
   a rotatable first member;
   a static second member cooperating with said first member to restrict the flow of a gas stream passing therebetween from an upstream region to a downstream region relative to said seal;
   injection means for injecting a tracer gas into said upstream region to mix with said gas stream thereby forming a mixed flow stream; and
   detection means for measuring the concentration of said tracer gas in said mixed flow steam in said downstream region thereby determining the leakage flow rate of said gas stream through said seal.

5. A seal, as recited in claim 4, wherein said rotatable first member includes a plurality of seal teeth, adjacent teeth being separated by a gap.

6. A seal, as recited in claim 5, wherein said upstream region is defined in part by a first gap between two upstream teeth and said downstream region is defined in part by a second gap between two downstream teeth.

7. A seal, as recited in claim 6, wherein said injection means includes a spray tube located within a first recess of said static second member.

8. A seal, as recited in claim 7, wherein said tube is located radially outwardly from said first gap.

9. A seal, as recited in claim 7, wherein said detection means includes a perforated tube located within a second recess of said static member for sampling said mixed flow stream and a tracer gas analyzer;
   said injection means further including means for measuring the flow rate of said injected tracer gas; and
   wherein the flow rate of said gas stream from said upstream region to said downstream region is determined by the equation:

$$Y = x(1-c)/R(c-j),$$

where
   x = flow rate of said tracer gas,
   c = concentration by volume of said tracer gas in said mixed flow stream,
   R = ratio of the density of said tracer gas to the density of air, and
   j = concentration of said tracer gas in said gas stream.

10. A seal, as recited in claim 6, wherein said detection means includes a perforated tube located within a second recess of said static second member for sampling said mixed flow stream.

11. A seal, as recited in claim 10, wherein said detection means further includes a tracer gas analyzer.

12. A seal, as recited in claim 11, wherein said tracer gas analyzer is a thermal conductivity analyzer, gas chromatograph, or mass spectrometer.

13. A seal, as recited in claim 4, wherein said injection means includes a spray tube with a plurality of first holes therein.

14. A seal, as recited in claim 13, wherein said first holes are generally radially directed.

15. A seal, as recited in claim 4, wherein said detection means includes a perforated tube with a plurality of second holes therein.

16. A seal, as recited in claim 15, wherein said second holes are generally radially directed.

17. A seal, as recited in claim 4, wherein:
said injection means includes a spray tube with a plurality of first holes therein;
said detection means includes a perforated tube with a plurality of second holes therein; and
the number of said first and second holes is selected so as to reduce phasing between said tubes.

* * * * *